US012651136B2

(12) United States Patent
Hermans

(10) Patent No.: US 12,651,136 B2
(45) Date of Patent: Jun. 9, 2026

(54) METHOD FOR PRINTING A TEST CHART

(71) Applicant: Canon Production Printing Holding B.V., Venlo (NL)

(72) Inventor: Frank Hermans, Venlo (NL)

(73) Assignee: Canon Production Printing Holding B.V., Venlo (NL)

( * ) Notice: Subject to any disclaimer, the term of this patent is extended or adjusted under 35 U.S.C. 154(b) by 238 days.

(21) Appl. No.: 18/741,943

(22) Filed: Jun. 13, 2024

(65) Prior Publication Data

US 2024/0428032 A1 Dec. 26, 2024

(30) Foreign Application Priority Data

Jun. 21, 2023 (EP) ..................................... 23180509

(51) Int. Cl.
G06K 15/02 (2006.01)
G06K 15/00 (2006.01)

(52) U.S. Cl.
CPC ....... G06K 15/027 (2013.01); G06K 15/4065 (2013.01)

(58) Field of Classification Search
None
See application file for complete search history.

(56) References Cited

U.S. PATENT DOCUMENTS

| | | | | |
|---|---|---|---|---|
| 7,145,697 | B1 * | 12/2006 | Sharma | H04N 1/6097 |
| | | | | 358/448 |
| 7,620,211 | B2 * | 11/2009 | Browne | H04N 1/0005 |
| | | | | 356/435 |
| 2004/0119993 | A1 * | 6/2004 | Edge | H04N 1/6033 |
| | | | | 358/1.9 |

(Continued)

FOREIGN PATENT DOCUMENTS

JP 6064945 B2 1/2017

OTHER PUBLICATIONS

European Search Report, issued in Application No. 23 18 0509, dated Nov. 6, 2023.

*Primary Examiner* — Miya J Cato
(74) *Attorney, Agent, or Firm* — Birch, Stewart, Kolasch Birch, LLP

(57) ABSTRACT

A printing system and a method for printing a test chart by the printing system having a media input holder, a media output holder, a print engine and a print controller. The method includes receiving print data of a print job to be printed by the printing system, establishing a job type of the print job, upon establishing the job type to be a test chart type, establishing media properties of the print job, determining a first amount of empty sheets for the test chart which sheets have the established media properties and are suitable to serve as backing sheets for the test chart in a further analysis of the test chart when printed, the print engine producing the test chart by printing the print data of the print job on a sheet having the established media properties transported from the media input holder to the print engine, receiving the printed sheet in the media output holder, and automatically depositing the determined first amount of empty sheets before or after the printed sheet in the same media output holder, wherein the first amount of empty sheets is automatically transported from the media input holder to the media output holder.

7 Claims, 3 Drawing Sheets

(56)                    References Cited

U.S. PATENT DOCUMENTS

2013/0176579 A1*    7/2013   Unno ...................... H04N 1/46
                                                    358/1.9
2015/0350493 A1     12/2015  Sakatani

* cited by examiner

METHOD FOR PRINTING A TEST CHART

FIELD OF THE INVENTION

The present invention relates to a method for printing a test chart by a printing system having a media input holder, a media output holder, a print engine and a print controller, the method comprising the step of receiving print data of a print job to be printed by the printing system.

The present invention further relates to a printing system configured to perform the method according to the invention.

Hereinafter the media input holder may also be referred to as "media input tray" or "input tray". Hereinafter the media output holder may also be referred to as "media output tray" or "output tray".

BACKGROUND OF THE INVENTION

A variety of tests are used to determine ink and paper quality, and to measure their interactions. The tests are necessary to balance print quality, cost, and wear on the printing system. For the variety of tests test charts have been developed and used. After printing a test chart, the test chart can be measured by an external measuring device. When test charts are measured with an analysis apparatus like a spectrophotometer, some form of backing is needed to prevent shine-through of the surface below the sheet impacting the measurements. This can be either "white-backing", where a surface with a defined white color is placed below the sheet, or "self-backing", where several (for example 5) additional (empty) sheets of the same media are placed below the sheet to be measured. When there is no suitable backing option available at the time of measuring, the color patch charts cannot be correctly measured due to shine-through of the background. With the term "below" is meant at the side of the test chart which is opposite to the position of the analysis apparatus.

A typical solution for correct backing, is to use white-backing. This requires a white-backing board to be available that is large enough for the sheets that need to be measured. For example, a spectrophotometer may be delivered with a white-backing board which only fits roughly A4 sheets. Such a solution has the disadvantage that larger sheets need to be cut prior to measuring in order to fit.

In the case of self-backing, the solution is typically to provide user instructions, for example on a user interface of the printing system, to take additional empty sheets of the same media either from the media stock or out of the input tray. Such a solution has the disadvantage that taking the additional sheets can easily be forgotten, leading to no appropriate backing being available. It can also be inconvenient to find the correct media to be used for self-backing, in particular when measuring the charts remotely, far away from the engine or media stock, which may lead to delays or accidentally using the incorrect media for self-backing.

In the case of self-backing, another solution is to add additional empty pages to the print job data file by means of a document editor. For example a PDF file may be amended to contain at the end additional empty pages. This is disadvantageous since a person who prepares the print job for the test chart by doing the editing tasks on the original test chart print job file is another person than the operator at the printing system which may lead to communication errors. Additionally, it is not possible to edit the print job data in case the print job data is generated inside the printing system or controller and cannot be accessed for modification from outside the printing system.

It is an objective of the present invention to provide a method for mitigating the above mentioned problems in an efficient and productive way.

SUMMARY OF THE INVENTION

According to the present invention the objective is achieved by the method comprising the further steps of
establishing a job type of the print job, upon establishing the job type to be a test chart type,
establishing media properties of the print job,
determining a first amount of empty sheets for the test chart which sheets have the established media properties and are suitable to serve as backing sheets for the test chart in a further analysis of the test chart when printed,
the print engine producing the test chart by printing the print data of the print job on a sheet having the established media properties transported from the media input holder to the print engine,
receiving the printed sheet in the media output holder, and
automatically depositing the determined first amount of empty sheets before or after the printed sheet in the same media output holder, wherein the first amount of empty sheets is automatically transported from the media input holder to the media output holder.

The step of establishing the job type of the print job may comprise a sub-step of receiving via user input at a user interface of the printing system the job type of the print job. The user input can be done manually by an operator of the printing system. The operator may via a user interface of the printing system enter the job type—for example a regular job type or a test chart job type—which is then stored with the print job properties of the print job in the print controller.

The step of establishing the job type of the print job may be directly executed by the print controller of the printing system, if the job type is already one of the print job settings or properties of the submitted print job.

The step of determining the first amount of additional empty sheets may depend on media properties of the media to be used for the test chart. Examples of media properties which could be taken into account are a transparency level of the media, a weight of the media and/or a color of the media. The size of the additional empty sheets should not be smaller than but preferably equal to the size of the media used for the test chart print.

When the test chart that is to be measured using self-backing is printed, the printing system automatically ejects several additional (empty) sheets to the same media output holder as part of the same job. The test chart and the empty sheets can then be retrieved from the media output holder together.

It is presumed that the media input holder contains the relevant media which is transported to the print engine for printing and further transported to the media output holder in case of the printed test chart, or just transferred—without printing upon—from the media input holder to the media output holder in case of the empty sheets for self-backing. Both the printed test chart and the empty sheets for self-backing are deposited in the same media output holder.

In the basic case with one test chart, the best order is such that the entire stack can be picked up from the media output holder and measured without any reshuffling, i.e. when the chart is delivered face-down, the empty sheets should be deposited afterwards on top, or when the chart is delivered face-up, the chart should be deposited afterwards on top of the empty sheets.

The determined first amount of empty sheets is automatically deposited before or after the printed sheet in the same media output holder. "Before" is applied in the case where the order of test chart(s) and empty backing sheets is inverted. It is also possible to interleave the printed and unprinted sheets in several ways.

According to an embodiment the test chart is a colored patch chart.

According to an embodiment the further analysis of the printed test chart comprises measurements on the printed test chart below which the first amount of empty sheets is placed.

According to an embodiment the step of determining the first amount of empty sheets takes a kind of print data, the established media properties of the print job and the print job settings into account.

According to an embodiment the print data comprises multiple pages of a test chart and/or multiple test charts. In the special case of two test charts, one on the front of a sheet and the other on the back of another sheet, the best order of delivering the test charts and the empty backing sheets is: first face-down a front-printed test chart, then sufficient empty backing sheets, then a back-printed test chart, having the 2 printed sides on the outside of the stack and making it possible to measure both without reshuffling sheets by simply flipping the entire stack (as if it were a single sheet).

In case of two or more test charts printed on the same sheet side (of different sheets), the empty backing sheets could be after (or before) each test chart, or there could be a single set of empty backing sheets that need to be reused for each test chart.

The present invention also relates to a printing system for printing a test chart, the printing system comprising a print engine, a media input holder, a media output holder and a print controller, wherein the printing system is configured to execute the steps of the method according to the present invention.

The present invention also relates to a non-transitory recording medium comprising computer executable program code configured to instruct at least one computer to perform the method according to the present invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

DETAILED DESCRIPTION OF THE EMBODIMENTS

Figure 1:
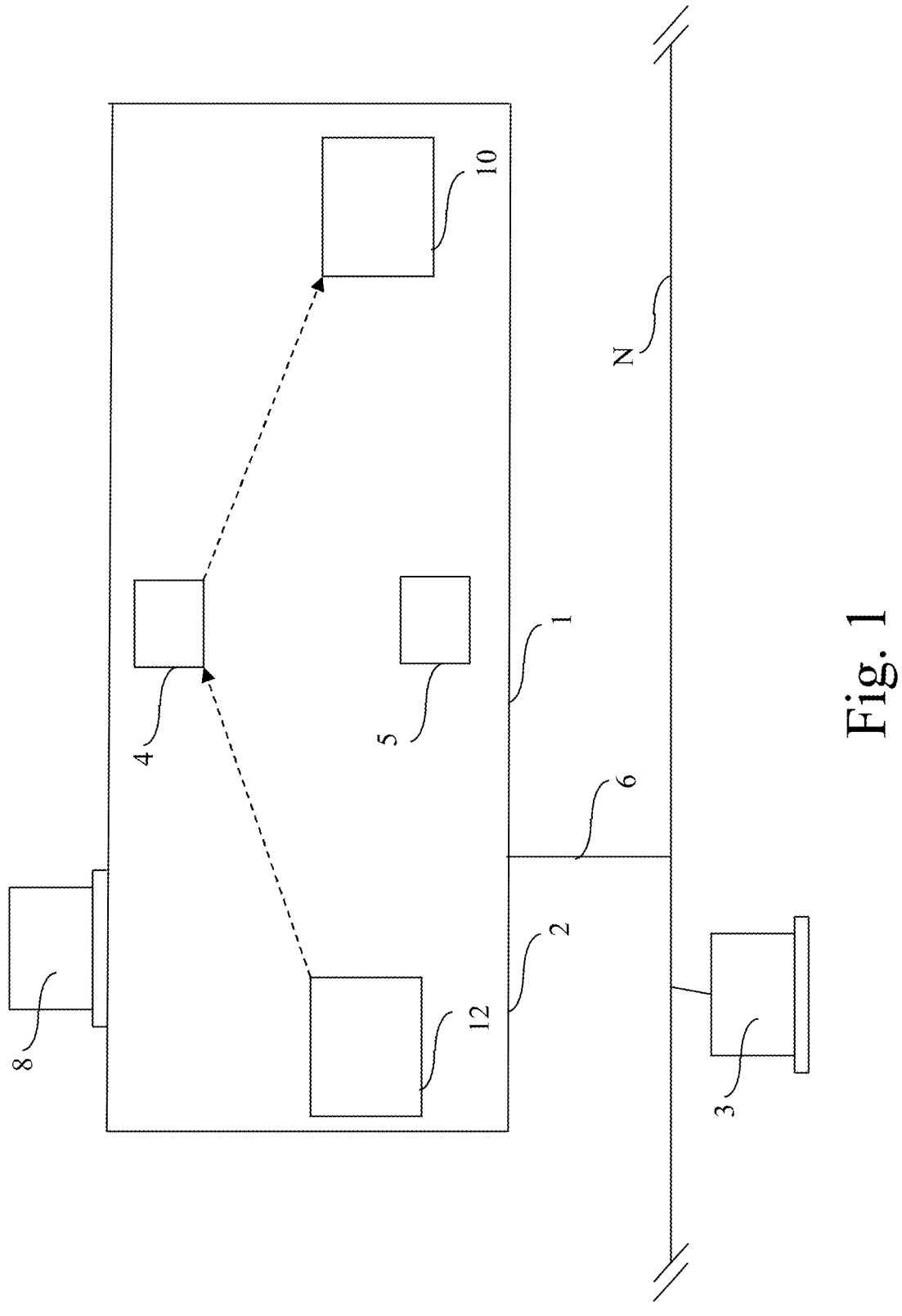
FIG. 1 shows a schematic view of a printing system according to the present invention.

The present invention will now be described with reference to the accompanying drawings, wherein the same or similar elements are identified with the same reference numerals throughout the several views.

FIG. 1 is a first schematic view of a printing system 1 according to the present invention. The printing system 1 is connected to a network N via a data connection 6 and comprises a user interface 8, a media input holder 12 for receiving and holding input of a plurality of sheets, a media output holder 10 for receiving and holding output of a plurality of sheets, a print engine 4 and a print controller 5. Printing instructions for the print controller 5 may be part of specifications of a print job received via the network N by the print controller 5. Printing instructions may also be entered via user interface 8 and stored in the printer memory of the print controller 5.

The data connection 6 may be a communication cable, a wireless connection, infrared beams or any other data communication means. Before the plurality of sheets is printed upon by the print engine 4, the digital information comprising print data and printing instructions is taken into account when the printing of the plurality of sheets is starting. The sheets are transported from the media input holder 12 along the print engine 4 to the media output holder 10. A printed sheet can be taken out of the media output holder 10 for further treatment or handling at a measurement location (not shown) like analysis with a spectrophotometer in case of a printed test chart.

A workstation 3 may be connected to the network N for submitting the print data of the test job to the printing system 1.

Figure 2:
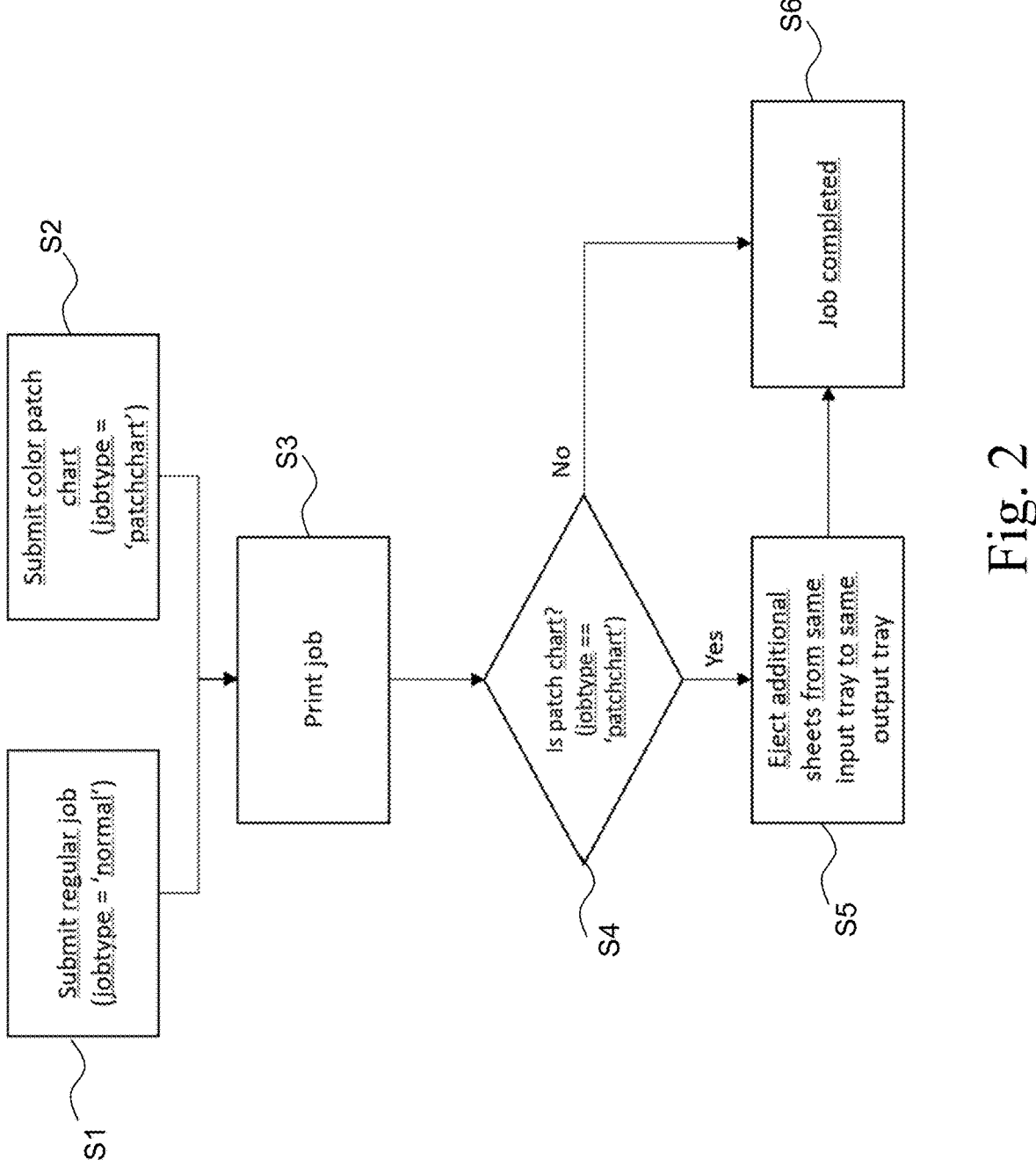
FIG. 2 is a flow diagram of an embodiment of the method according to the present invention.

FIG. 2 shows an example of the method according to the present invention. The print controller can detect that color patch charts are being printed, for example by setting an additional flag on the print job when it is submitted. The flag can then be used to eject a predefined or configurable number of additional sheets without printing on them. A predefined number of additional sheets may be stored in a system setting memory in the print controller. A configurable number of additional sheets may be set for each media type in a media catalogue residing in the print controller. The configurable number can be fetched from the media catalogue when the print controller detects a print job with a test chart job type.

In the example shown in FIG. 2 the test chart is deemed to be a color patch chart. However, other test charts may be envisioned according to the present invention. A regular print job may be submitted S1 to the printing system with job type "normal" or a color patch chart may be submitted S2 to the printing system with job type "patchchart". The job type name for the test chart is hereinafter called "patchchart". However, other test chart job type names like "test chart" may be envisioned. After the submission of the print job the print job is printed S3 by the print engine. In a next step S4 it is checked if the job type is "patchchart". If so, additional empty sheets are ejected S5 from the same media input holder to the same media output holder. The amount of additional empty sheets has been determined by the print controller. The additional empty sheets may be transferred from the media input holder to the media output holder along the print engine which does not print on the additional sheets. If not so, the job is completed S6, meaning a deposition of the printed sheets in the media output holder.

The example shown in FIG. 2 indicates how regular print jobs and test chart jobs can be submitted to the printing system. The print controller detects the job type and then optionally automatically ejects additional empty sheets that can be used for self-backing during measurement.

5

Figure 3:
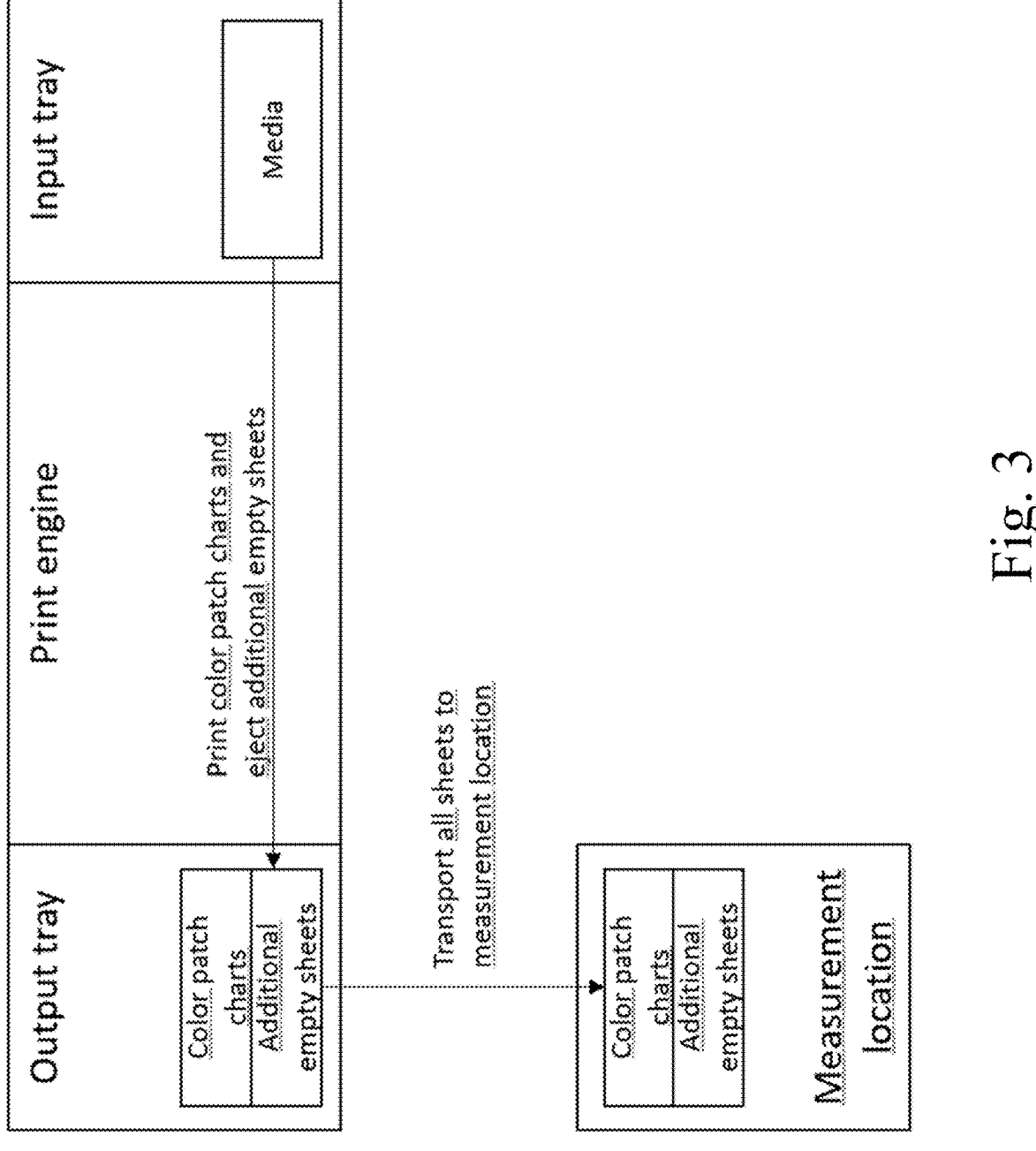
FIG. 3 is a schematic diagram of the entities involved in the method according to the present invention.

FIG. 3 shows schematically the printing system and a measurement location for further analysis. Steps of the method are executed on the printing system as explained in FIG. 2. When the printed test charts and the additional empty sheets are deposited in the media output holder, all sheets can be transported—manually or automatically—to a measurement location as one package of sheets. The additional empty sheets to be used for self-backing do not need to be retrieved separately, but can immediately be retrieved from the same output tray that contains the printed test charts. The empty sheets and the printed test chart(s) can easily be transported to the location where the charts are measured, reducing the risk that the empty sheets are forgotten. The printing system assures that the sheets used for self-backing are of the correct—same—media as used for printing the test charts, reducing the risk of accidentally using the wrong media for self-backing.

FIG. 3 shows how the print engine automatically ejects additional sheets of the same media (from the same input tray) to be deposited in the output tray together with the printed color patch charts. The complete set of sheets in the output tray is then transported to the measurement location (potentially far away from the print engine), making sure that the empty sheets needed for self-backing are available when performing the measurements.

The skilled person will recognise that other embodiments are possible within the scope of the appended claims.

The invention claimed is:

1. A method for printing a test chart by a printing system having a media input holder, a media output holder, a print engine and a print controller, the method comprising the steps of:

receiving print data of a print job to be printed by the printing system;

establishing a job type of the print job;

upon establishing the job type to be a test chart type, establishing media properties of the print job;

determining a first amount of empty sheets for the test chart, the sheets having the established media properties and being suitable to serve as backing sheets for the test chart in a further analysis of the test chart when printed;

the print engine producing the test chart by printing the print data of the print job on a sheet having the established media properties transported from the media input holder to the print engine;

receiving the printed sheet in the media output holder; and automatically depositing the determined first amount of empty sheets before or after the printed sheet in the same media output holder, wherein the first amount of empty sheets is automatically transported from the media input holder to the media output holder.

2. The method according to claim 1, wherein the test chart is a colored patch chart.

3. The method according to claim 1, wherein the further analysis of the printed test chart comprises measurements on the printed test chart below which the first amount of empty sheets is placed.

4. The method according to claim 1, wherein the step of determining the first amount of empty sheets takes a kind of print data, the established media properties of the print job and the print job settings into account.

5. The method according to claim 1, wherein the print data comprises multiple pages of a test chart and/or multiple test charts.

6. A printing system for printing a test chart, the printing system comprising a print engine, a media input holder, a media output holder and a print controller, wherein the printing system is configured to execute the steps of the method of claim 1.

7. A non-transitory recording medium comprising computer executable program code configured to instruct at least one computer to perform the method according to claim 1.

* * * * *